(12) United States Patent
Wu et al.

(10) Patent No.: US 12,219,180 B2
(45) Date of Patent: Feb. 4, 2025

(54) ACTIVELY-LEARNED CONTEXT MODELING FOR IMAGE COMPRESSION

(71) Applicant: Adobe Inc., San Jose, CA (US)

(72) Inventors: Gang Wu, San Jose, CA (US); Yang Li, Chapel Hill, NC (US); Stefano Petrangeli, Mountain View, CA (US); Viswanathan Swaminathan, Saratoga, CA (US); Haoliang Wang, San Carlos, CA (US); Ryan A. Rossi, San Jose, CA (US); Zhao Song, Seattle, WA (US)

(73) Assignee: Adobe Inc., San Jose, CA (US)

( * ) Notice: Subject to any disclaimer, the term of this patent is extended or adjusted under 35 U.S.C. 154(b) by 436 days.

(21) Appl. No.: 17/749,846

(22) Filed: May 20, 2022

(65) Prior Publication Data

US 2023/0379507 A1   Nov. 23, 2023

(51) Int. Cl.
*G06K 9/00*        (2022.01)
*G06N 20/00*       (2019.01)
(Continued)

(52) U.S. Cl.
CPC ............ *H04N 19/96* (2014.11); *G06N 20/00* (2019.01); *H04N 19/182* (2014.11);
(Continued)

(58) Field of Classification Search
CPC ........ H04N 19/50; H04N 19/91; H04N 19/13; H04N 19/192; H04N 19/96; H04N 19/182; H04N 19/184; G06N 3/082; G06N 3/086; G06N 20/00; G06T 9/40; G06T 9/001; G06T 9/002; G06T 3/4046; G06T 2207/20081; G06T 2207/20084; G06V 10/778
See application file for complete search history.

(56) References Cited

U.S. PATENT DOCUMENTS 12,026,624 B2*  7/2024  Gonzalez ............... G06N 3/082

OTHER PUBLICATIONS

F. Pourkamali-Anaraki and W. D. Bennette, "Adaptive Data Compression for Classification Problems," in IEEE Access, vol. 9, pp. 157654-157669, 2021 (Year: 2021).*

(Continued)

*Primary Examiner* — Utpal D Shah
*Assistant Examiner* — Kevin M Coomber
(74) *Attorney, Agent, or Firm* — Shook, Hardy & Bacon L.L.P.

(57) ABSTRACT

Embodiments described herein provide methods and systems for facilitating actively-learned context modeling. In one embodiment, a subset of data is selected from a training dataset corresponding with an image to be compressed, the subset of data corresponding with a subset of data of pixels of the image. A context model is generated using the selected subset of data. The context model is generally in the form of a decision tree having a set of leaf nodes. Entropy values corresponding with each leaf node of the set of leaf nodes are determined. Each entropy value indicates an extent of diversity of context associated with the corresponding leaf node. Additional data from the training dataset is selected based on the entropy values corresponding with the leaf nodes. The updated subset of data is used to generate an updated context model for use in performing compression of the image.

20 Claims, 9 Drawing Sheets

(51) Int. Cl.
*H04N 19/182* (2014.01)
*H04N 19/184* (2014.01)
*H04N 19/50* (2014.01)
*H04N 19/91* (2014.01)
*H04N 19/96* (2014.01)

(52) U.S. Cl.
CPC ........... *H04N 19/184* (2014.11); *H04N 19/50* (2014.11); *H04N 19/91* (2014.11)

(56) References Cited

OTHER PUBLICATIONS

A. Holub, P. Perona and M. C. Burl, "Entropy-based active learning for object recognition, " 2008 IEEE Computer Society Conference on Computer Vision and Pattern Recognition Workshops, Anchorage, AK, USA, 2008, pp. 1-8 (Year: 2008).*

* cited by examiner

ACTIVELY-LEARNED CONTEXT MODELING FOR IMAGE COMPRESSION

BACKGROUND

Data is becoming more and more abundant. In particular, trillions of images are created and shared every year. Compression algorithms are used to store and transmit these images. These image compression algorithms leverage the dependencies among pixels to reduce the storage requirement.

Image compression algorithms, such as lossy compression and lossless compression, can be used to perform image compression. Context-modeling based lossless image compression usually consists of three modules: prediction module, context modeling module, and entropy encoding module. The prediction model predicts the pixel values based on the surrounding pixels, and their gradients and a prediction error, also known as a residual, is calculated for each pixel. The difference between the actual pixel value and the predicted value is the residual value. The context is a feature vector constructed using known surround pixels. In image compression algorithms, the context model, sometimes called the error context model, builds a model for the residual for each pixel with respect to a context to further reduce the redundancies in the residuals. Therefore, the image compression algorithms use the context and residual for each pixel to build the context model. Then the entropy encoding module will encode the residuals with respect to the built context model into bitstreams. Some metadata, such as the context model itself is also encoded into the bitstream, which is needed in the decompression process. The context modeling process can provide estimates of the conditional probability of the residual, given the associated context. The accuracy of the conditional probability determines the efficiency of the entropy encoding. As such, context modeling is the most critical part of the image compression process. Building such a context model, however, is usually the most time-consuming and resource intensive part of the compression procedure.

SUMMARY

Embodiments of the present disclosure relate to, among other things, an actively-learned context modeling system and method. In particular, as described herein, actively-learned context modeling is used to facilitate efficient generation of context models, thereby increasing efficiency of image compression. To efficiently generate context models, actively-learned context modeling uses only a subset of data or a portion of data to generate an accurate context model for use in performing image compression.

In operation, the actively-learned context modeling method identifies a subset of data from a training set and uses the subset of data to build or train a context model that obtains relatively similar performance as a context model that is trained using all the data. During the training of a context model, a regression tree is built that takes the error in prediction (also called residuals) and clusters error values with similar statistical characteristics based on some context information derived from surrounding pixels. The training set contains all context-residual pairs of the image in an image compression system. The actively-learned context modeling determines the characteristics of the selected portion of data and updates the portion of data until a portion of data is identified that can build a favorable context model.

In particular, in embodiments described herein, an initial subset of data is selected and a context model is built or trained based on the initial subset of data. The actively-learned context modeling then updates the subset by including more data from the training set. The actively-learned context modeling can select data to update the subset using different techniques that can provide the lowest cross entropy value with the updated context model over the entire residual data. In one embodiment, it evaluates the likelihood of prediction of the remaining data in the training set and updates the subset of data with the data with largest likelihood of prediction value. To determine the likelihood of prediction, the residuals are used as the observed data and the context model is used as the probability. Updating the subset with a pixel that provides the largest likelihood of prediction can result in a low cross entropy value over the entire residual data. A low cross entropy value over the entire residual data is desirable. The smaller the cross entropy is, the better compression can be obtained such that the size of an image or data can be minimized without degrading the quality of the image to an unacceptable level. A low cross entropy indicates that the probability function is very accurate over the whole data. In another embodiment, it updates the subset of data by selecting higher percentage of data from leaf nodes in the context model that have a higher entropy value. The entropy allows the actively-learned context modeling method to determine whether the selected portion of data is diverse. The context model built using a diverse portion of data has low redundancy.

The actively-learned context modeling method continues to iteratively update the subset of data until a threshold subset of data size is reached. The threshold subset of data size can be a number of pixels allowed for training or a number of data allowed for training (an allowable data value). For example, threshold subset of data size can be a predetermined amount of pixels from the training set or training data. In another example, threshold subset of data size can be a number based on how fast the process should be. Advantageously, the final subset of data that is identified by the actively-learned context modeling method generates a context model that has similar performance to a context model built with all the data.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Figure 1:
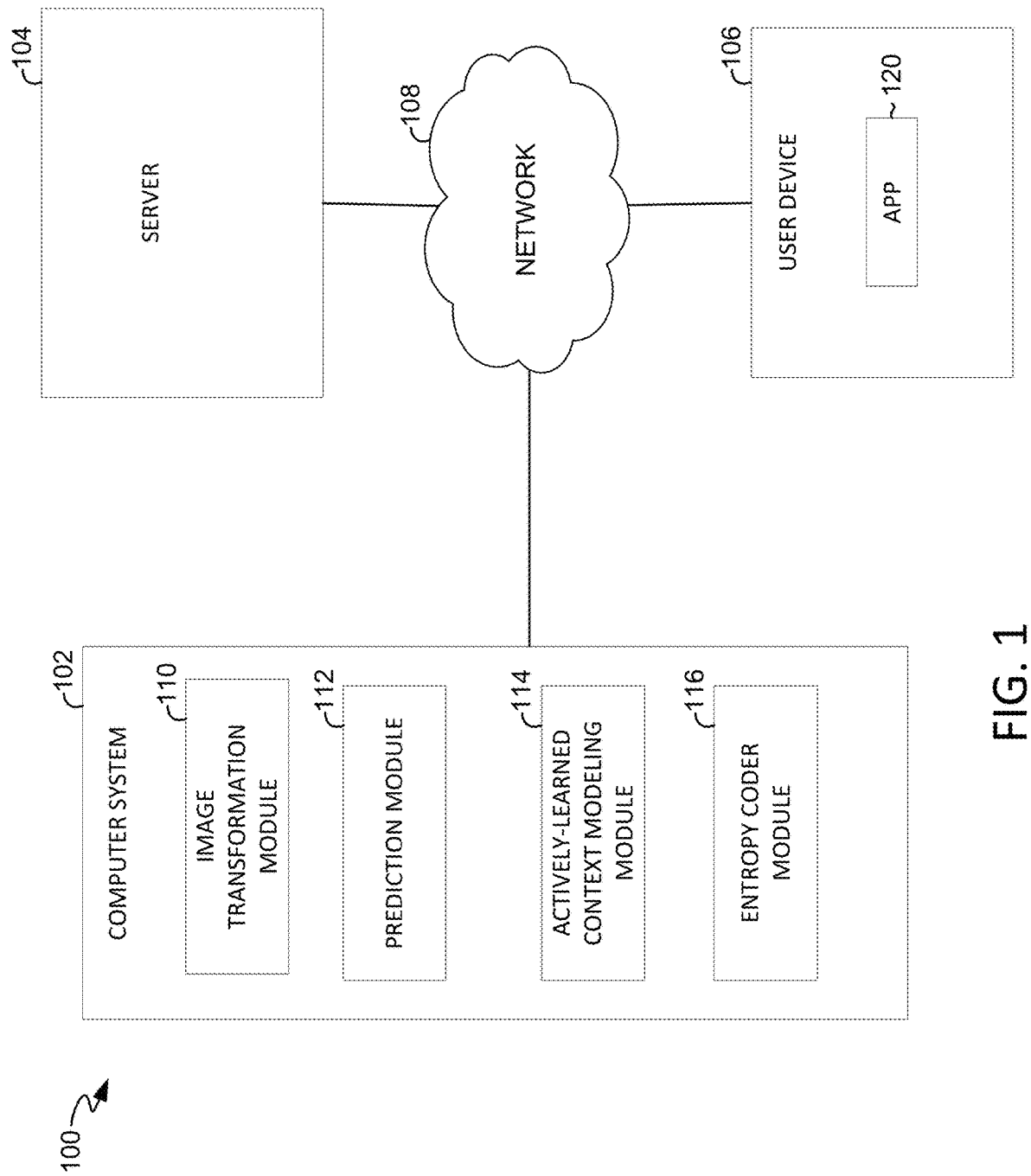
FIG. 1 is a diagram of an environment used to perform actively-learned context modeling, according to embodiments of the present disclosure.

In the current era of big data, data is becoming more and more abundant. Running intricate algorithms on the full dataset incurs tremendous computational burden. For example, conventional image compression algorithm can involve tremendous computational burden. Image compression is generally performed using lossy compression or lossless compression. Lossy image compression allows for some distortions in the decompressed data in exchange for a higher compression rate, while lossless image compression requires that there be no quality loss in the decompressed data. Lossless compression is particularly important in those applications where the original image content cannot be altered (e.g., to enable further processing, archiving etc.).

In conventional image compression systems, lossless compression algorithms include the steps of transforming the image, predicting the pixel value, context modeling, and entropy coding. In lossless compression, the pixel-value prediction process takes into account the difference between actual pixel values and the predicted pixel values. The pixel-value prediction process generally utilizes the surrounding pixels to predict the target pixel value.

The context modeling process takes the error in prediction (also called residuals) and clusters error values with similar statistical characteristics based on some context information derived from surrounding pixels. Context modeling in image compression algorithms, also known as error context modeling, builds or trains a model for the residual for each pixel with respect to a context. The context model built using image compression systems is typically in the form of a decision tree. Context modeling, is an important component in image compression systems. However, it is also an expensive component in terms of time and resource utilization costs. For example, in conventional image processing systems, context models are built using all available context-residual pairs (e.g., a context-residual pair for each pixel in an image), which is resource intensive and incurs a tremendous computational cost.

By way of example, Free Lossless Image Format (FLIF) is a particular type of lossless image compression algorithm used in an image compression system. FLIF utilizes a context model called Meta-Adaptive Near-zero Integer Arithmetic Coding (MANIAC). The MANIAC context model is a decision tree based error context model. The MANIAC context model builds a tree using the context for each pixel (derived from surrounding pixels) and the difference in prediction values. Each leaf node of the MANIAC tree maintains a frequency table, which is subsequently used to entropy encode the residuals. The tree is a clustering model where data points from the training set are navigated through the tree into one of the leaf nodes. As the tree is built or trained, each leaf node contains a cluster of data points from the training set. Building the MANIAC tree is an important, but a very time-consuming step in the entire image compression process. In particular, in order to build the MANIAC tree, the conventional context modeling process iterates over all available context-residual pairs. This training procedure can take around 45% of the encoding time.

Accordingly, embodiments of the present disclosure are directed towards reducing the time and resource utilization used to perform context modeling (e.g., for image compression). The embodiments of the present disclosure utilize actively-learned context modeling to build a context model using a portion of the data that has similar performance to a context model generated with all the data. In this regard, a context model is generated using context-residual pairs associated with only a portion of pixels. Using only a portion of context-residual pairs to generate a context model enables a more efficient generation of context models, thereby increasing the efficiency and resource utilization of performing image compression.

At a high level, to actively train a context model using context-residual pairs associated with only a portion of pixels, an iterative process is performed to selectively identify suitable context-residual pairs for generating the context model. In each iteration, context-residual pairs associated with additional pixels can be selected to build an updated context model until a threshold size of subset of data is obtained. To select pixels and/or context-residual pairs to add to the subset of data used to generate the context model, various methods can be used.

For example, one embodiment involves selecting pixels by evaluating the likelihood of prediction of the remaining data in the training set and updating the subset of data with the largest likelihood of prediction value over the entire dataset. Determining the likelihood of prediction involves determining the value of the likelihood function of probability. To determine the likelihood of prediction, the residuals are used as the observed data and the context model is used as the probability. Updating the subset with a pixel that provides the largest likelihood of prediction can result in a low cross entropy value over the entire residual data. A low cross entropy value over the entire residual data is desirable. The smaller the cross entropy is, a more efficient compression can be obtained. A low cross entropy indicates that the probability function is very accurate over the whole data. In some examples, the subset is updated with only one context-residual pair (corresponding to the pixel having the largest likelihood of prediction value over the entire dataset). In another example, the subset is updated with only a certain number or a batch size of context-residual pairs (for e.g. corresponding to a certain number of pixels having the largest likelihood of prediction over the entire dataset). In some embodiments, the likelihood of prediction value may have to be calculated for each pixel absent in the subset.

Another embodiment involves selecting a higher percentage of pixels from leaf nodes in the context model that have a higher entropy value. Entropy values generally refer to values that indicate an extent of diversity of context associated with pixels in a cluster that represent a leaf node in a context model. As described herein, leaf nodes associated with a greater or higher entropy value indicate a greater diversity of context associated with the pixels contained in the cluster therein. If the entropy value of the leaf node is low, then the context-residual pairs in the leaf nodes cluster share similarities which would lead to a desirable context model. If the entropy value of the leaf node is high, then the context-residual pairs in the leaf node's cluster don't share similarities. The entropy allows the actively-learned context modeling method to determine whether the selected portion of data is diverse. The context model built using a diverse portion of data has low redundancy. It should be understood that other methods of updating the subset can also be used. The subset of data is iteratively updated and an updated context model is generated during each iteration until the size of the subset of data attains a threshold subset of data size (e.g., data associated with a predetermined number of pixels). When the subset of data attains or reaches the threshold subset of data size, the final updated subset of data is used to build the final context model.

In operation, to perform actively-learned context modeling, an initial subset of data from a training dataset is selected (e.g., at random). Such selected data can include context-residual pairs corresponding with any number of pixels. The training dataset can include context-residual pairs corresponding with each pixels, for example, in an image. The actively-learned context modeling method builds or trains an initial context model using the initial subset of data (e.g., context-residual pairs) and then selects additional data to update the subset with. As described, the actively-learned context modeling can select data to update the subset using different techniques that can provide the lowest cross entropy value with the updated context model over the entire residual data. In one embodiment, the actively-learned context modeling evaluates the likelihood of prediction of the remaining data in the training set and updates the subset of data with the largest likelihood of prediction. In another embodiment, it updates the subset of data by selecting higher percentage of data from leaf nodes in the context model that have a higher entropy value. The entropy allows the actively-learned context modeling method to determine whether the selected portion of data is diverse. The context model built using a diverse portion of data has low redundancy. A desirable context model can have a low cross entropy over the entire dataset.

The actively-learned context modeling method continues to iteratively update the subset of data and generate updated context models therefrom until the size of the subset of data attains a threshold subset of data size (e.g., data associated with a predetermined number of pixels). When the subset of data attains or reaches the threshold subset of data size, the final updated subset of data is used to build the final context model. The threshold subset of data size can be a number of pixels allowed for training or a number of data allowed for training (an allowable data value). For example, a threshold subset of data size can be a predetermined amount of pixels from the training set or training data. In another example, threshold subset of data size can be a number based on how fast the process should be.

Advantageously, iteratively refining the subset of data by selectively updating the subset (e.g., by selecting data based, at least in part, on the likelihood of prediction or entropy values of the residuals in leaf nodes) allows the image compression system to build or train a context model having a lower redundancy, thereby enabling the context model to have similar performance to a context model built using all the data (e.g., context-residual pairs associated with each pixel of an image). Further, utilizing only a portion of available data (e.g., context-residual pairs associated with only a portion of pixels of an image) enables a more efficient process, resulting in reduction of computing resources needed to perform image compression.

It should be understood that the embodiments of the present technology can be used in any system that uses context modeling and is not limited to systems using image processing with error context modeling.

Exemplary Environment for Image Compression

Turning to FIG. 1, FIG. 1 is a diagram of an environment used to perform actively-learned context modeling, according to embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 9.

The system 100 is an example of a suitable architecture for implementing certain aspects of the present disclosure. In one embodiment, the system 100 includes, among other components not shown, an image compression system 102, a server 104, and a user device 106. Each of the image compression system 102, server 104, and user device 106 shown in FIG. 1 can comprise one or more computer devices, such as the computing device 900 of FIG. 9, discussed below. As shown in FIG. 1, the image compression system 102, the server 104, and the user device 106 can communicate via a network 108, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present disclosure. Each may comprise a single device or multiple devices cooperating in a distributed environment. For instance, the image compression system 102 could be provided by multiple devices collectively providing the functionality of the image compression system 102 as described herein. Additionally, other components not shown may also be included within the network environment.

It should be understood that any number of user devices, servers, and other components can be employed within the operating environment 100 within the scope of the present disclosure. Each can comprise a single device or multiple devices cooperating in a distributed environment.

User device 106 can be any type of computing device capable of being operated by a user. For example, in some implementations, user device 106 is the type of computing device described in relation to FIG. 9. By way of example and not limitation, a user device 106 may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 106 can include one or more processors, and one or more computer-readable media. The computer-readable media may include computer-readable instructions executable by the one or more processors. The instructions may be embodied by one or more applications, such as application 120 shown in FIG. 1. Application 120 is referred to as a single application for simplicity, but its functionality can be embodied by one or more applications in practice. As indicated above, the other user devices can include one or more applications similar to application 120.

The application(s) may generally be any application capable of facilitating actively-learned context modeling (e.g., via the exchange of information between the user devices and the server 104). In some implementations, the application(s) comprises a web application, which can run in a web browser, and could be hosted at least partially on the server-side of environment 100. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 120 can either initiate the actively-learned context modeling module 114 or facilitate actively-learned context modeling via a set of operations initiated, for example, based on a user selection. In embodiments, an image(s) is selected that will be processed using actively-learned context modeling. Additionally in some embodiments, users can select suitable entropy values or threshold subset of data sizes or any other values that can be used to determine a desirable context model in the actively-learned context modeling. The actively-learned context modeling module 114 will perform the actively-learned context modeling method described herein. The actively-learned context modeling module 114 performs an iterative process to selectively identify suitable context-residual pairs associated with only a portion of pixels. An iterative process is performed to selectively identify suitable context-residual pairs for generating the context model. In each iteration, pixels, the actively-learned context modeling module 114 selects one or more context-residual pairs to build an updated context model until a threshold size of subset of data is obtained. The pixels and/or context-residual pairs are selected based on likelihood of prediction of the remaining data in the training set or by based on entropy values of each leaf node in the context model. It should be understood that other methods of updating the subset can also be used. A desirable context model will have low cross entropy over the entire dataset. The threshold subset of data size can be a number of pixels allowed for training. For example, threshold subset of data size can be a predetermined amount of pixels from the training set or training data. In another example, threshold subset of data size can be a number based on how fast the process should be. In some embodiments, the application 120 can initiate multiple operations to effectuate actively-learned context modeling during image processing. For example, the application 120 can initiate multiple processes using the actively-learned context modeling modules 114 on a burst compression containing multiple images. In operation, a user can indicate or provide an image to process. The application 120 can initiate the image transformation module 110 in the image compression system 102 and/or provide the image to the image transformation module 110. The image transformation module 110 obtains an image (e.g., from user device 106 or a data store) and transforms the image to decorrelate the color channels. Upon image transformation, the prediction module 112 utilizes the surrounding pixels to predict the target pixel value for each pixel. The difference between the targeted value and the actual value of each pixel is the residual value of the pixels.

To perform actively-learned context modeling, the actively-learned context modeling module 114 selects an initial subset of data from the training set (e.g. at random). Such selected data can include context-residual pairs corresponding with any number of pixels. The training dataset can include context-residual pairs corresponding with each pixels, for example, in an image. The actively-learned context modeling module 114 builds or trains an initial context model using the initial subset of data (e.g., context-residual pairs). An iterative process is performed to selectively identify suitable context-residual pairs for generating the context model. In each iteration, the actively-learned context modeling module 114 selects one or more context-residual pairs to build an updated context model until a threshold size of subset of data is obtained. The actively-learned context modeling module 114 updates the subset by selecting one or more context-residual pairs using different methods.

One embodiment involves selecting context-residual pairs by evaluating the likelihood of prediction of the remaining data in the training set and updating the subset of data with the pixel or the context-residual pair having the largest likelihood of prediction value over the entire dataset. Determining the likelihood of prediction involves determining the value of likelihood function of probability. To determine the likelihood of prediction, the residuals are used as the observed data and the context model is used as the probability. Updating the subset with a pixel that provides the largest likelihood of prediction can result in a low cross entropy value over the entire residual data. A low cross entropy value over the entire residual data is desirable. The smaller the cross entropy is, the better compression can be obtained. A low cross entropy indicates that the probability function is very accurate over the whole data. In some examples, the subset is updated with only one context-residual pair (corresponding to the pixel having the largest likelihood of prediction value over the entire dataset). In another example, the subset is updated with a batch size of context-residual pairs (for e.g. corresponding to the pixels having the largest likelihood of prediction over the entire dataset). In some embodiments, the likelihood of prediction value may have to be calculated for each pixel in each iteration. In other embodiments, the likelihood of prediction is calculated for a portion of pixels not included in the subset of data.

Another embodiment involves selecting a higher percentage of pixels from leaf nodes in the context model that have a higher entropy value. Entropy values generally refer to values that indicate an extent of diversity of context associated with pixels in a cluster that represent a leaf node in a context model. As described herein, leaf nodes associated with a greater or higher entropy value indicate a greater diversity of context associated with the pixels contained in the cluster therein. If the entropy value of the leaf node is low, then the context-residual pairs in the leaf nodes cluster share similarities which would lead to a desirable context model. If the entropy value of the leaf node is high, then the context-residual pairs in the leaf node's cluster don't share similarities. The entropy allows the actively-learned context modeling method to determine whether the selected portion of data is diverse. The context model built using a diverse portion of data has low redundancy. It should be understood that other methods of updating the subset can also be used.

The actively-learned context modeling module 114 continues to iteratively update the subset of data and generate updated context models therefrom until the size of the subset of data is attains a threshold subset of data size (e.g., data associated with a predetermined number of pixels). When the subset of data attains or reaches the threshold subset of data size, the final updated subset of data is used to build the final context model. The threshold subset of data size can be a number of pixels allowed for training or a number of data allowed for training (an allowable data value). For example, a threshold subset of data size can be a predetermined amount of pixels from the training set or training data. In another example, threshold subset of data size can be a number based on how fast the process should be.

The final updated subset of data that is identified by the actively-learned context modeling module 114 can build a context model that has similar performance to a context model built with all the data. The entropy coder module 116 encodes the context model generated by the actively-learned context modeling module 114.

As described herein, server 104 can facilitate built a context model using the actively-learned context modeling module 114. Server 104 includes one or more processors, and one or more computer-readable media. The computer-readable media includes computer-readable instructions executable by the one or more processors. The instructions may optionally implement one or more components of the actively-learned context modeling module 114, described in additional detail herein. At a high level, the actively-learned context modeling module 114 performs an iterative process to selectively identify suitable context-residual pairs associated with only a portion of pixels. An iterative process is performed to selectively identify suitable context-residual pairs for generating the context model. In each iteration, pixels, the actively-learned context modeling module 114 selects context-residual pairs associated with the highest likelihood of prediction or selects a higher percentage of context-residual pairs associated with leaf nodes in the context model having a higher entropy value. It should be understood that other methods of updating the subset can also be used.

For cloud-based implementations, the instructions on server 104 may implement one or more components of the actively-learned context modeling module 114, and application 120 may be utilized by a user to interface with the functionality implemented on server(s) 104. In some cases, application 120 comprises a web browser. In other cases, server 104 may not be required. For example, the components of the actively-learned context modeling module 114 may be implemented completely on a user device, such as user device 106. In this case, the actively-learned context modeling module 114 may be embodied at least partially by the instructions corresponding to application 120. Therefore, the actively-learned context modeling module 114 can operate on a server, such as server 104, or on a user device, such as user device 106 or partially on both.

These components may be in addition to other components that provide further additional functions beyond the features described herein. The image compression system 102 can be implemented using one or more devices, one or more platforms with corresponding application programming interfaces, cloud infrastructure, and the like. While the image compression system 102 is shown separate from the user device 106 in the configuration of FIG. 1, it should be understood that in other configurations, some or all of the functions of the image compression system 102 can be provided on the user device 106.

System Using Actively-Learned Context Modeling

Figure 2:
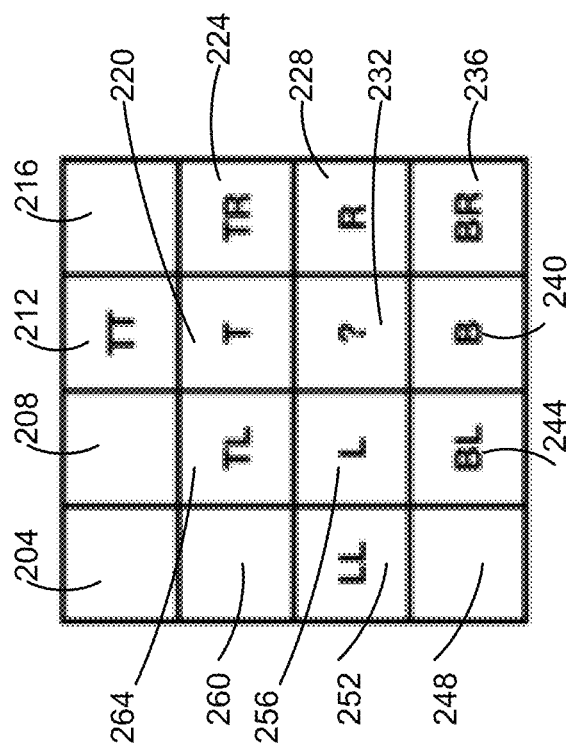
FIG. 2 is a diagram of an exemplary image used during an image compression.
Figure 3:
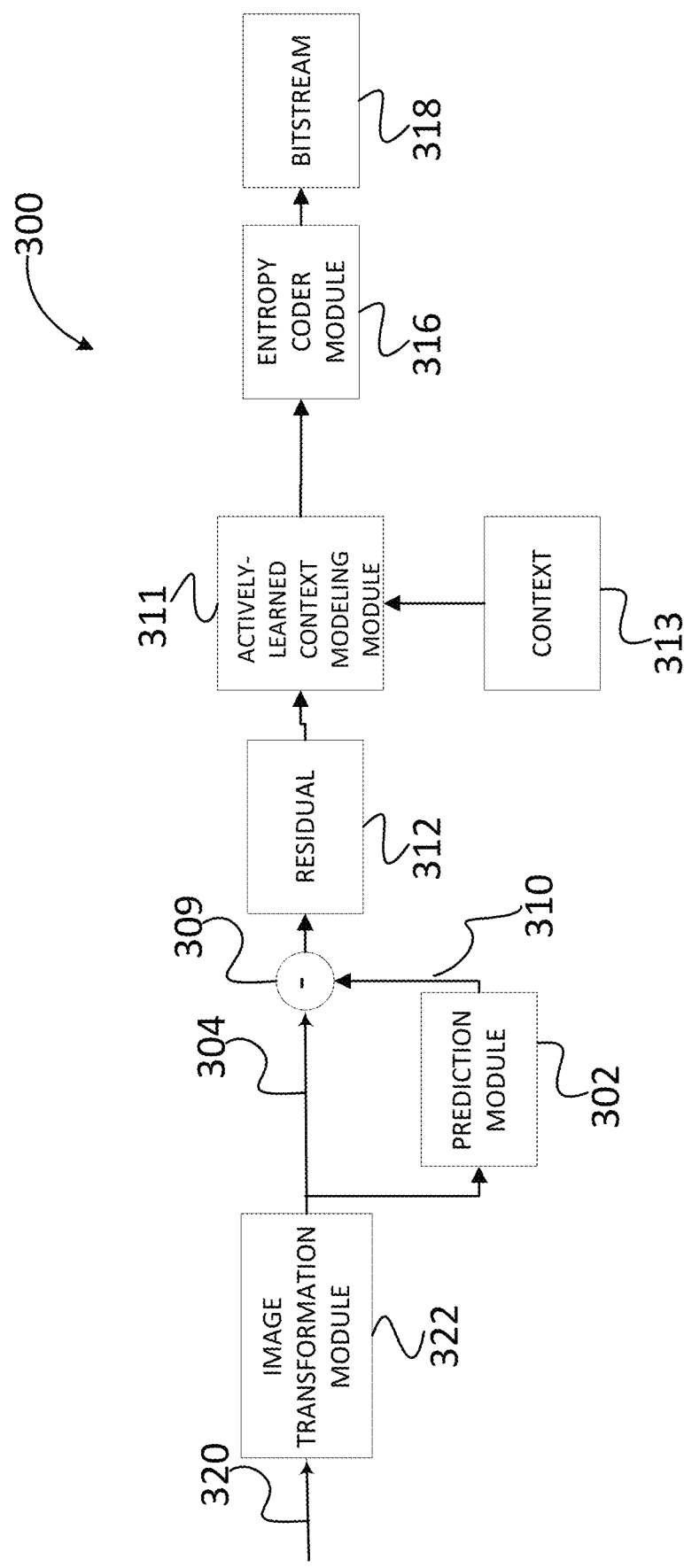
FIG. 3 is a block diagram illustrating an exemplary image compression system using an actively-learned context modeling module in accordance with one embodiment of the present disclosure.

With reference to figures FIG. 2 and FIG. 3, FIG. 3 is a block diagram illustrating an exemplary image compression system 300 using actively-learned context modeling, in accordance with one embodiment of the present disclosure, and FIG. 2 is a diagram of an exemplary image 200 used in the image compression system. Turning to FIG. 3, the image compression system obtains an image 320 to be compressed. The image 320 can be a Red-Green-Blue (RGB) source image file. In one example, the image transformation module 322 uses reversible Luma, Chroma Orange, and Chroma Green (YCoCg) color transformation to decorrelate the color channels. After the image compression system 300 transforms the image 320 to different color channels 304, the image compression system 300 processes the color channels 304 through the rest of the modules in the image compression system 300 one after another following the order of Luma (Y), Chroma Orange (Co), and Chroma Green (Cg). FIG. 2 illustrates an exemplary image 200 in one of the color channels. The image 200 is made up of pixels 204-264. The image compression system 300 calculates the residuals 312 for each pixel in the image 200 by calculating the difference 309 between the actual value 304 of the pixel and the predicted value 310 of the pixel. To calculate the residual 312, the image compression system 300 first uses the prediction module 302 to predict the target pixel value for each pixel 204-264. For example, to predict the target value for pixel 232 marked as "?" in FIG. 2, the prediction module 302 will take the median of surrounding pixels. For example, the prediction module 302 will take into consideration the pixel located towards the top 220 of the target pixel 232 marked as (T), the pixel located towards the left 256 of the target pixel 232 marked as (L), and the pixel located towards the top left 264 of the target pixel 232 marked as (TL). One way of determining the median is by the following using the following pixel information: the top pixel T (232), the left pixel L (256), and the gradient of the top and left pixels determined by T+L−TL. It should be understood that a combination of other surrounding pixels can be used to predict the target pixel 232.

After predicting the pixel values for each pixel 204-264, the difference 309 between predicted pixel value 310 and actual value 304 is determined to determine the residual value 312 for each pixel 204-265. This difference or error value between the actual value 304 of the pixel and the predicted pixel value 310 of the pixel is also called a residual value 312.

In one embodiment, after determining the residual values 312 for the pixels, the image compression system 300 utilizes an actively-learned context modeling module 311 to obtain a context model for the residuals 312. The actively-learned context modeling module 311 will initiate the actively-learned context modeling method described herein. The actively-learned context modeling module 311 identifies a subset of data from a training set to build or train a context model that can obtain a similar performance as a context model built or trained using all the data. The training set can include the context values 313 and residual values 312 for pixels in the image. The data can consist of any other information as well or any combination of different data as well.

In some embodiments, the actively-learned context modeling module 311 selects an initial subset of data from a training set. In some embodiments, a subset of data may be randomly selected. For example, if the total pixels in an image are pixels 1-10, then context-residual pairs for pixels 1, 2, 7, and 9 are randomly selected as the initial subset of data. The initially selected subset of data is used to build or train an initial context model. For example, the rest of the pixels not included in the subset are then navigated into one of the leaf nodes in the context model depending on the context for each pixel and the decision nodes of the context model. For example, after the context model is built or trained first leaf node has a cluster that includes context-residual pairs for pixels 1, 3, and 4. The second leaf node has a cluster that includes context-residual pairs for pixel 2. The third leaf node has a cluster that includes context-residual pairs for pixels 5 and 7. The fourth leaf node has a cluster that includes context-residual pairs for pixels 8 and 9.

After the initial context model is built, the actively-learned context modeling module 311 can select data or context-residual pairs from the training set to update the subset. For example, in one embodiment, the actively-learned context modeling module calculates the likelihood of prediction of the remaining pixels not in the subset and updates the subset with the pixel having the largest likelihood of prediction value of the remaining data in the training set. In another embodiment, the actively-learned context modeling module determines the entropy value of each leaf node in the tree and updates the subset based on the entropy value of each leaf node in the tree. For example, a higher percentage of data is selected from leaf nodes in the context model that have a higher entropy value. If the entropy value of the leaf node is low, then the context-residual pairs in the leaf nodes cluster share similarities which would lead to a desirable context model. If the entropy value of the leaf node is high, then the context-residual pairs in the leaf node's cluster don't share similarities. It should be understood that other methods of selecting data to update the subset can also be used. The updated subset of data can then be used to generate an updated context model. The actively-learned context modeling module 311 continues to iteratively update the subset of data and generate updated context models therefrom until the size of the subset of data attains a threshold subset of data size (e.g., data associated with a predetermined number of pixels). When the subset of data attains or reaches the threshold subset of data size, the final updated subset of data is used to build the final context model. The threshold subset of data size can be a number of pixels allowed for training or a number of data allowed for training (an allowable data value). For example, a threshold subset of data size can be a predetermined amount of pixels from the training set or training data. In another example, threshold subset of data size can be a number based on how fast the process should be.

By selecting only a portion of the data to build or train the context model, the actively-learned context modeling module 311 may provide a speedup of the image compression system 300 while slightly reducing compression rates i.e. the output bitstream will be slightly longer, or slightly larger compressed file size. In this example, the actively-learned context modeling module 311 is used after obtaining the residual values 312 and before encoding the context model using entropy encoding module 316. It should be understood that the actively-learned context modeling module 311 can be used anywhere in the image compression system 300 or in any algorithm using a context modeling module.

When the final subset of data is identified, the context model built or trained using the final subset of data is provided to the entropy coder module 316. The entropy coder module 316 will entropy code the context model and represent the image in an efficient manner to prepare it for transmission. The entropy encoded data travels through the bitstream 318 and transmitted over a channel. For example, the entropy encoded data travels to a server, user device, or a cloud computing service, or the like. After it is transmitted, a decoder performs reverse operations illustrated in system 300 to obtain the image.

Figure 4:
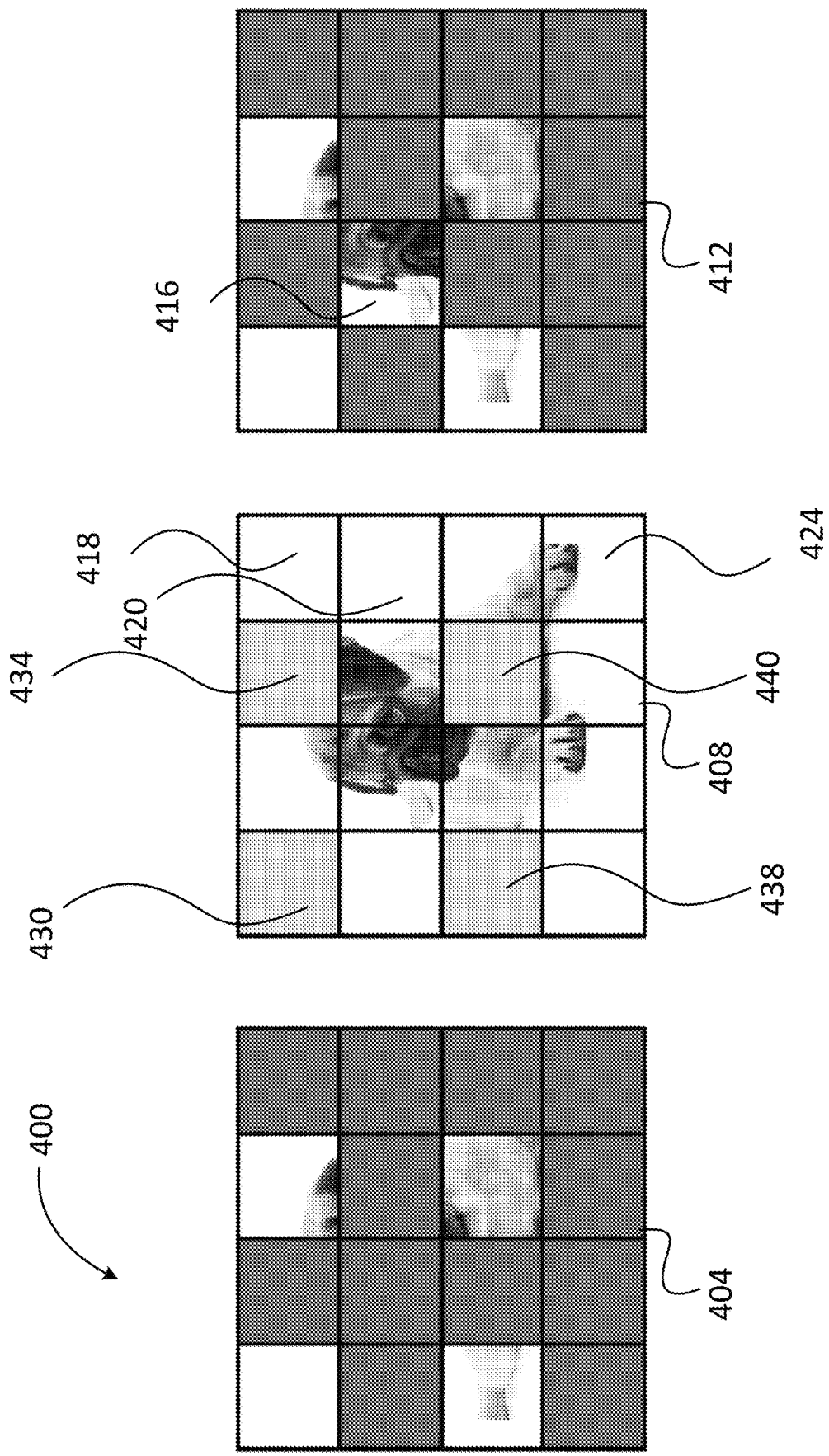
FIG. 4 are exemplary images illustrating an implementation of actively-learned context modeling in accordance with various embodiment of the present disclosure.

With reference to FIG. 4, FIG. 4 are exemplary images 400 illustrating an implementation of actively-learned context modeling in accordance with various embodiment of the present disclosure.

In one embodiment, the actively-learned context modeling module 311 selects an initial portion of pixels at random 404 that are indicated by non-grayed boxes. The portions of the pixels in 404 that are non-gray are the pixels in the initial subset that the actively-learned context modeling module 311 selects initially to build the context model. These initial pixels 404 for the initial subset can be selected randomly. With that selected subset of data of pixels, an initial context model $f_\theta$ is generated 404 and the initial context model is updated using the remaining pixels 408 not in the subset 404. As illustrated in 408, the context model built or trained using pixels not in the initial subset 404. The 430, 434, 438, 440 pixels in 408 are the pixels in the initial subset. The context model is built or trained using pixels not in the initial subset 404 that are not 430, 434, 438, 440 pixels in 408. After the context model is built, a pixel 416 is selected to update the subset. In this example, the subset includes in the initial non-gray pixels from 404, and a new pixel 416 is selected and the subset is updated with the new pixel 416. Note that the new pixel 416 is a pixel that doesn't have more information than the rest of the pixels 418, 420, 424. The actively-learned context modeling module 311 can use any process to select context-residual pairs to update the subset that can provide the lowest cross entropy value with the updated context model over the entire residual data. For example, the actively-learned context modeling module 311 can use either the likelihood of prediction or entropy value of residuals in leaf nodes in the context model to select a pixel or a subset of pixels to update the subset. With the updated subset of data 412, the actively-learned context modeling module 311 builds or trains a new context model.

Figure 5:
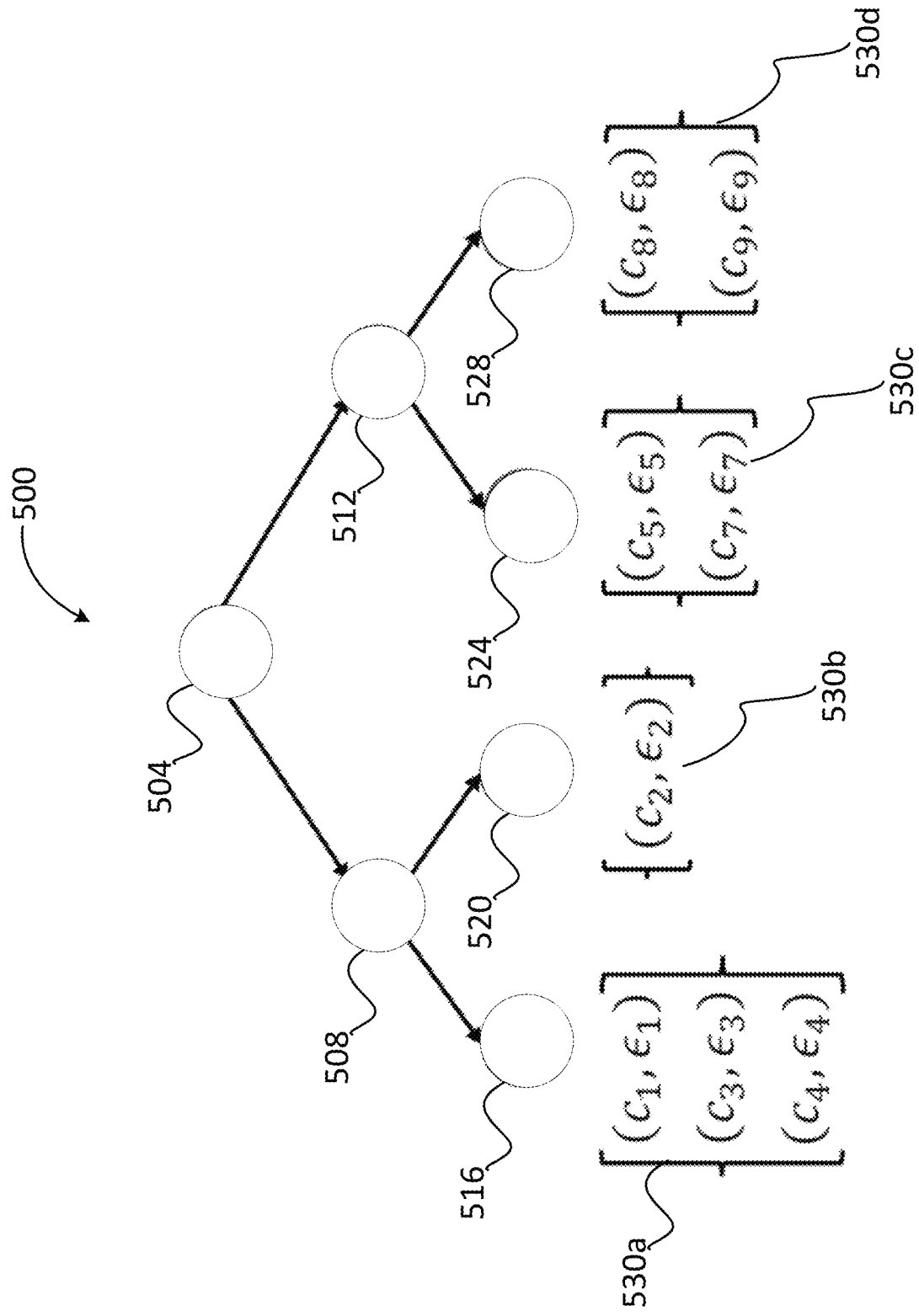
FIG. 5 illustrates an exemplary context model built using only a portion of data of a single image in accordance with one embodiment of the present disclosure.

FIG. 5 illustrates an exemplary context model 500 built using only a portion of data for a single image in accordance with one embodiment of the present disclosure. In one example, the context model 500 is a decision tree. The decision tree 500 includes decision nodes 504, 508, 512. The tree is a clustering model where candidate data points are navigated through the decision nodes 504, 508, 512 to navigate into one of the leaf nodes 516, 520, 524, 528.

In one embodiment, the decision tree 500 clusters a portion of data determined by the actively-learned context modeling module 311 into leaf nodes 516, 520, 524, 528 based on the context or property values and the decision node. For example, leaf node 516 includes cluster 530a, leaf node 520 includes cluster 530b, leaf node 524 includes cluster 530c, and leaf node 528 includes cluster 530d. Each pixel is navigated into one of the leaf nodes and joins the cluster of data in the leaf node.

In this example, each pixel in the cluster 530a, 530b, 530c, 530d is represented by a context-residual pair (c, $\epsilon$), where c corresponds to the context information 313 for a pixel and $\epsilon$ corresponds to the residual value 312 for the pixel. In another example, c can correspond to specific property values for the pixel. It should be understood that other information and combinations of the information can be used to build the tree 500.

Exemplary Method Implementing Actively-Learned Context Modeling Using Algorithm 1

Figure 6:
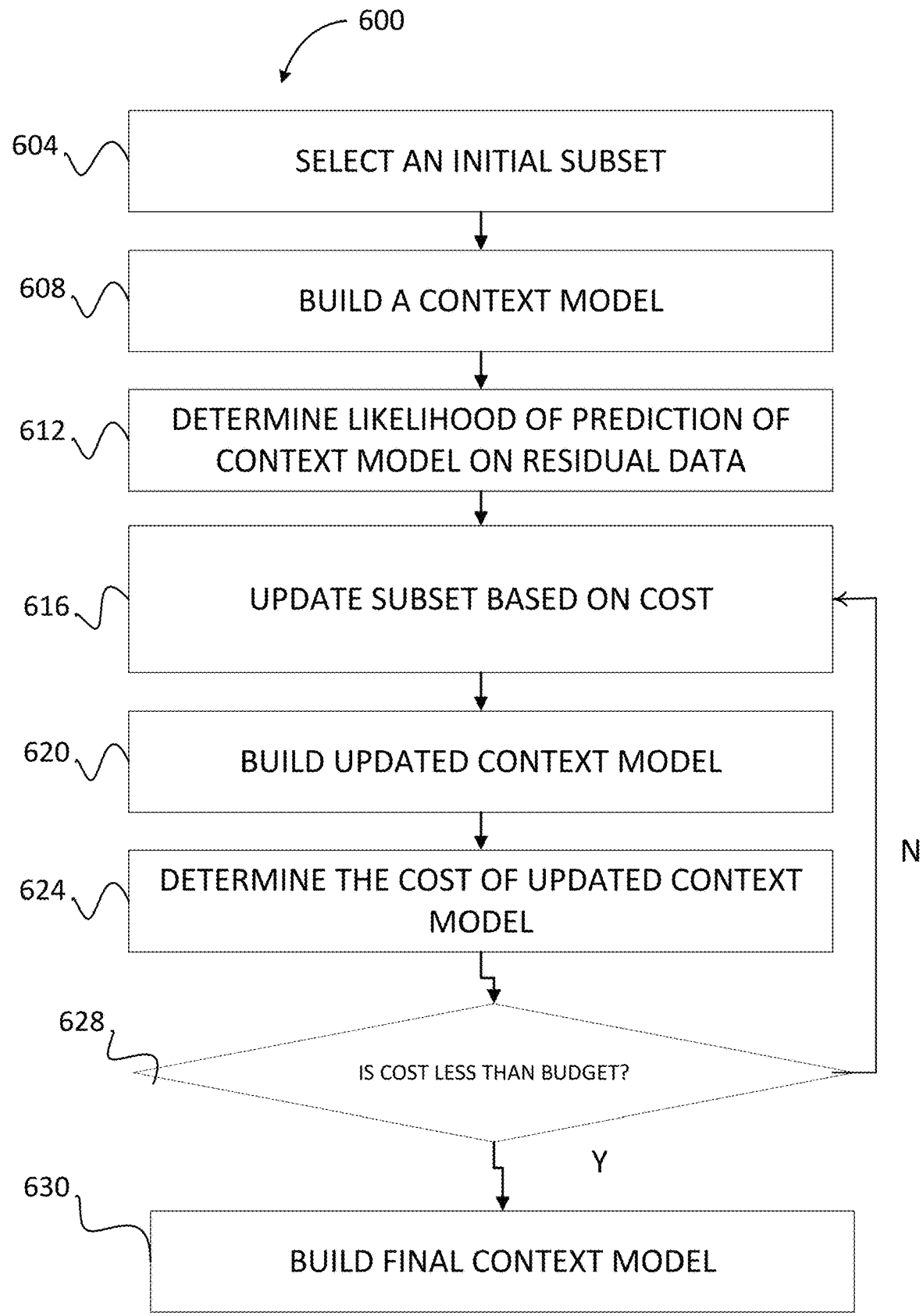
FIG. 6 is a flow diagram illustrating an exemplary method for implementing actively-learned context modeling in accordance with one embodiment of the present disclosure.

FIG. 6 is a flow diagram illustrating an exemplary method 600 for implementing actively-learned context modeling in accordance with one embodiment of the present disclosure. A processing devices such as a user device, a server, a cloud computing service or the like implements the exemplary method 600. The actively-learned context modeling module of an image compression system can initiate the actively-learned context modeling method 600 described herein. In one example, actively-learned context modeling enables identification of a portion of data to build or train a context model that can obtain a similar performance as a context model built using all the data. In embodiments, the actively-learned context modeling enables identification of the portion of data using a greedy approach. This approach involves exhaustively comparing evaluating the likelihood of prediction function values of the remaining data not in the subset, and selecting the one with largest likelihood of prediction value. One example of method 600 is based on Algorithm 1 further described below.

In one embodiment of a processing device implementing the method 600 at block 604 selects an initial subset of data or portion from a training set corresponding to an image to be compressed. In one example, the initial subset of data is selected at random from the training set. The training set can be include data such as context and residuals pairs for each pixel. The initial subset of data can be selected at random or using a predetermined method or using an algorithm. It could also be selected based on data from the image such as the context, residual or the like. For example, the initial subset of data can be selected to be diverse so that the elements have low redundancy. Some of the data in the initial subset of data can be selected using a combination of the above. In one example, the initial subset of data is determined by an algorithm or provided by a user.

Continuing with FIG. 6, the processing device implementing the method 600 at block 608, builds or trains or generates an initial context model based on the initial subset of data. The context model is in the form of a decision tree having a set of leaf nodes.

The processing device implementing the method 600 at block 612 determines a likelihood of prediction for the context model on a portion of residual data, for example, for residual data of pixels absent or not included in the subset. In another example, the processing device at block 612 determines the likelihood of prediction value for each pixel not in the subset. The processing device uses the likelihood of prediction to select context-residual pairs with the highest likelihood of prediction value to obtain a low cross entropy value over the entire residual data. In one example, in every iteration, only the context-residual pair having the highest likelihood of prediction value is selected and added to the subset. In another example, a certain number or a batch size of context-residual pairs having the highest likelihood of prediction value can be selected and added to the subset.

Continuing with FIG. 6, the processing device implementing the method 600 at block 616, updates the subset of data with the context-residual pair having the largest likelihood of prediction. The context-residual pair is selected from the data absent in the subset of data. In another example, the processing device implementing the method 600 at block 616, updates the subset of data with a batch size of context-residual pairs having the highest likelihood of prediction value (e.g., the 5 context-residual pairs having the highest likelihood of prediction value are selected and used to update the subset). The batch size of context-residual pairs can be provided or determined.

The processing device implementing the method 600 at block 628 determines whether the size of the subset of data is less than a threshold subset of data size. If the size of the subset of data is less than the threshold subset of data size in block 628, then the processing device implementing the method 600 goes back to block 608 and builds a context model with the updated subset. If the size of the updated subset of data is determined to be not less than the threshold subset of data size in block 628, then the processing device implementing the method 600 at block 630 builds the final context model using the updated subset of data.

Exemplary Method Implementing Actively-Learned Context Modeling Using Algorithm 2

Figure 7:
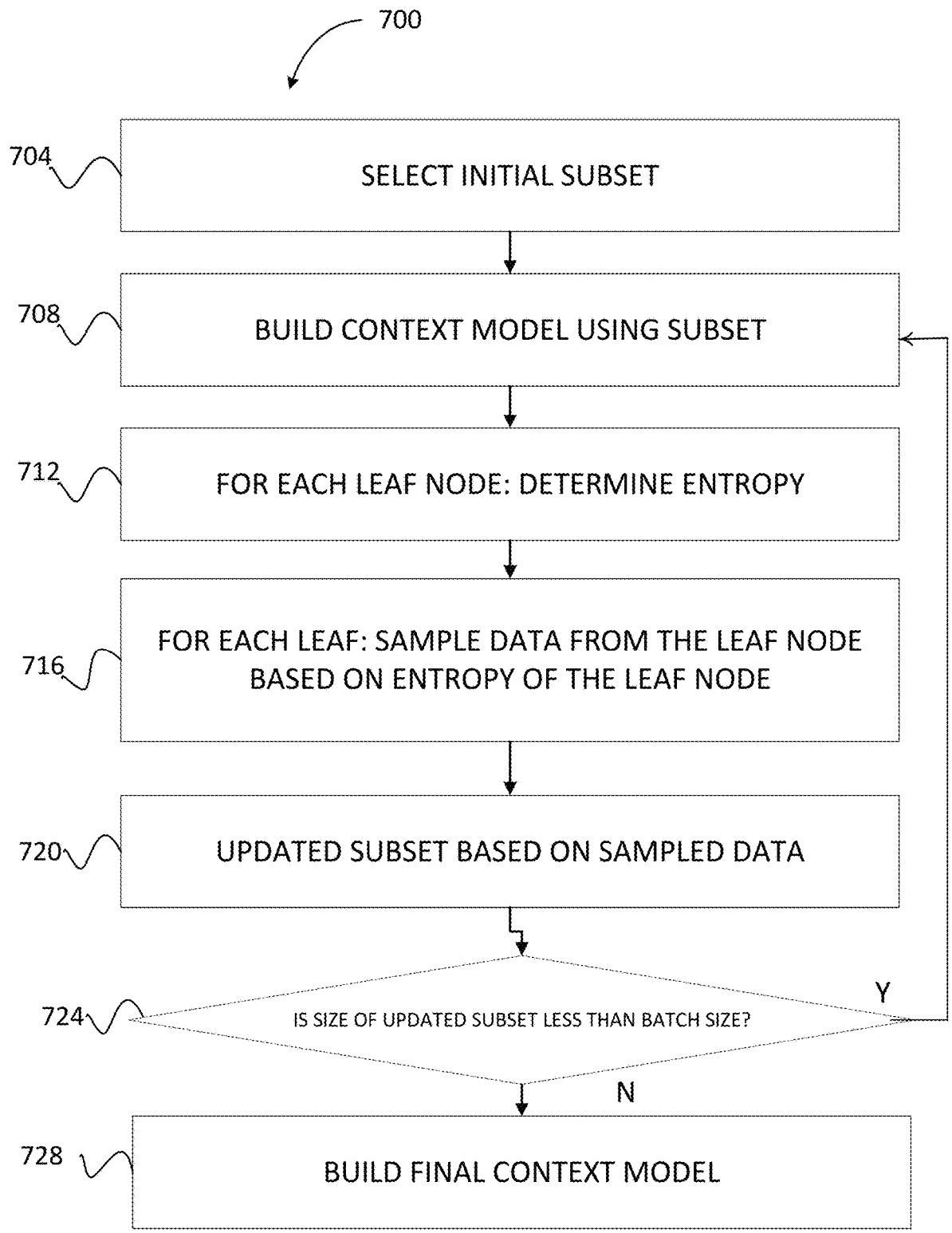
FIG. 7 is a flow diagram illustrating another exemplary method for implementing actively-learned context modeling in accordance with one embodiment of the present disclosure.

FIG. 7 is a flow diagram illustrating an exemplary method 700 for implementing actively-learned context modeling in accordance with one embodiment of the present disclosure. A processing device such as a user device, server, cloud computing service or the like can implement the exemplary method 700. The actively-learned context modeling module of an image compression system can initiate the actively-learned context modeling method 700 described herein. One example of method 700 is based on Algorithm 2 further described below.

In one embodiment of the method 700, a processing device implementing the method 700 at block 704 selects an initial subset of data or portion of data from the training dataset or training set. The training dataset corresponds to an image to be compressed. The subset of data corresponds to a subset of data of pixels of the image. The initial subset of data can be selected at random or using a predetermined method or using an algorithm.

Continuing with FIG. 7, the processing device implementing the method 700 at block 708 builds or train or generate a context model based on the initial subset of data. The processing device implementing the method 700 at block 712 determines an entropy value for each leaf node of the context model. The entropy value indicates an extent of diversity of context associated with the corresponding leaf node. The processing device implementing the method 700 at block 716 samples or selects data from each leaf node of the context model based on the entropy value of the leaf node. In one example, the subset of data is updated based on the calculated entropy value. For example, if the entropy value for the leaf node in the context model has a high entropy value, then a higher percentage of the data is selected from the leaf node having a higher entropy value and lower percentage of data is selected from the leaf node having a lower entropy value. The subset is then updated with this selected data. For example, if a leaf node has a higher entropy value, then a higher percentage of the updated subset of data will come from that leaf node. In one example, the method 700 updates the subset each time with a batch of data determined by a batch size. For example, if batch size is 5, then during each iteration 5 context-residual pairs are added to the subset. A higher percentage of the context-residual pairs in the batch will come from leaf nodes with a higher entropy value and a lower percentage of the context-residual pairs in the batch will come from leaf nodes with a lower entropy value.

Continuing with FIG. 7, the processing device implementing the method 700 at block 720 updates the subset of data with the sampled data from block 716. The method processing device implementing the method 700 at block 724 determines whether the updated subset of data is less than a threshold subset of data size. The threshold subset of data size is a threshold value that can be predetermined, can be provided, or can be calculated or determined. If the size of the updated subset of data is determined to be less than the threshold subset of data size in block 724, then the processing device implementing the method 700 continues back to block 708 to build a context model using the updated subset of data. If the size of the updated subset of data is determined to be not less than the threshold subset of data size in block 724, then the processing device implementing the method 700 at block 728 builds a final context model using the updated subset of data.

Exemplary Algorithms Using Actively-Learned Context Modeling

Algorithm 1

In one embodiment, Algorithm 1 provides one example of an algorithm that can be used to implement actively-learned context modeling. The actively-learned context modeling module can initiate the actively-learned context modeling method described in Algorithm 1. Algorithm 1 can be used to identify or select a portion or a subset of data from a training set such that the context model is generated or trained with the selected portion and obtains a similar performance to a context model generated or trained using all the data. Algorithm 1 can be seen in Table 1:

TABLE 1

Algorithm 1: Active context modeling

Require: training set $\mathcal{D} = \{(c_i, \epsilon_i)\}_{i=1}^{N}$, context model $p_\theta$, selection budget M
1: select a training pair at random and update $\mathcal{S}$
2: while $|\mathcal{S}| < M$ do
3:    train a context model $p_\theta$ using $\mathcal{S}$
4:    $k = \arg\min_j \log p_\theta(\epsilon_j \mid c_j), \forall (c_j, \epsilon_j) \notin \mathcal{S}$
5:    $\mathcal{S} \leftarrow \mathcal{S} \cup \{(c_k, \epsilon_k)\}$
6: end while
7: train the final context model $p_\theta$ using $\mathcal{S}$ According to Algorithm 1, given a training set, Budget M, context model $f_\theta$ and training procedure $\mathcal{P}$, a subset of data S can be determined or found using steps 3-6 of Algorithm 1 such that a subset S is selected of size M, where the subset contains context-residuals pairs with the highest likelihood of prediction. The selected subset of data is updated with context-residual pairs having the highest likelihood prediction values, which will decrease the cross entropy on entire residual data of the updated model trained with updated subset. The low cross entropy over the entire residual data can be determined by $\Sigma - p_i \log p(f_\theta(c_i))$, where $p_i$ refers to probability of pixel i and $\log p(f_\theta(c_i))$ is the likelihood of prediction value.

As seen in Algorithm 1, in one example, a training set or data and a budget M is provided, determined, predetermined, or calculated. The value M is also the threshold subset of data size and can be a number of pixels allowed for training or a number of data allowed for training (an allowable data value). For example, M can be a predetermined amount of pixels from the training set or training data. In another example, M can be a number based on how fast the process should be. The budget M is the size of final subset. In another example, the budget could be compression speed, which is determined by the subset size. An initial subset of data is selected by the actively-learned context modeling module 311 (Step 1 of Algorithm 1). S is the size of the current subset of data and M is the size of the final subset. In one example, the subset of data S is called a training pair and all the context-residual pairs of data are the training set. The subset of data S can either be selected at random, through a parameter, through an input, through an algorithm, through predetermined methods or through any other method. In one example, a training pair is selected at random and the subset of data S is updated (Step 1 of Algorithm 1).

In one example, while the size of the current subset of data S is less than the budget M or a threshold subset of data size, steps 3-6 of Algorithm 1 are performed (Step 2 of Algorithm 1). The steps 3-6 of the algorithm include building or training a context model using the subset of data S (Step 3 of Algorithm 1), selecting a context-residual pair to update the subset with (Step 4 of Algorithm 1) and updating the subset with the context-residual pair (Step 5 of Algorithm 1).

Steps 3-6 of the algorithm include performing mathematical analysis on the context model after each iteration to determine the likelihood of prediction that represents a number of bits required to encode each residual in the context model. Data points with high likelihood are encoded efficiently using the updated context model. The likelihood of prediction can be determined by calculating the log probability for each residual in the entire training set not including the data in the subset. The cross entropy of a context model over the entire dataset can be determined by $\Sigma - p_i \log p(f_\theta(c_i))$. The negative log probability value of the entire training set is equivalent to the cross entropy.

For example, in step 4 of the Algorithm, the log probability for each residual in the entire training set not in the subset is calculated. In one example, Algorithm 1 iterates until the log probability over the entire training set is as high as possible when it is trained on the selected subset of data S. The log probability is the log of value of the sample probability function evaluated at a given data point. The subset S is selected such that the log probability over the entire training set is as high as possible when it is trained on the selected subset S as is noted in Equation 5 below:

$$S = \arg\max \, \mathbb{E}_{\theta \sim P(\theta|S)}[\Sigma_{i=1}^{N} \log(P_{i|c_i;\theta}[I(\epsilon_i)])] \quad \text{Equation (5)}$$

Such that $S \subseteq D$, $|S|=M$, where $P(\theta|S)$ indicates the distribution of parameters trained with the selected subset of data S. For example, for a MANIAC tree, $\theta$ represents the tree structure. Therefore, when S reaches size M (Step 6 of Algorithm 1), Algorithm 1 can identify a final subset that includes the pairs with the largest likelihood of prediction value over the entire residual data. The final subset that has the largest likelihood of prediction value over the entire residual data will provide a low cross entropy value. The smaller the cross entropy is, the better compression can be obtained.

With continued reference to Algorithm 1, if the size of the subset of data is less than a budget M (Step 2 of Algorithm 1), then the subset of data is updated with the context-residual pair having the lowest likelihood of prediction value (Step 5 of Algorithm 1). The actively-learned context modeling module 311 trains or builds the final context model using the final updated subset of data S if the size of the subset of data is more than the budget M (Steps 6 and 7 of Algorithm 1).

In some examples, the subset is updated with only one context-residual pair (corresponding to the pixel having the largest likelihood of prediction). In another example, the subset is updated with only a batch size of context-residual pairs (corresponding to the pixels having the largest likelihood of prediction). In some embodiments, the likelihood of prediction value is calculated for each pixel absent or not in the subset. In other embodiments, the likelihood of prediction is calculated for a portion of pixels absent or not in the subset. Algorithm 2 provides a method to avoid determining values for each pixel and instead uses entropy values of leaf nodes to update the subset.

Algorithm 2

An exemplary actively-learned context modeling module of an image compression system actively-learned context modeling method using can implement Algorithm 2 in a system that uses FLIF image compression. It should be understood that Algorithm 2 can be implemented in any other system as well. Algorithm 2 allows the actively-learned context modeling method to not evaluate the likelihood of prediction at each iteration as seen in Algorithm 1. Instead, in Algorithm 2, the actively-learned context modeling method selects a batch B of data points at each step to add to the subset. In order to avoid the situation that the selected batch B is closely related, the actively-learned context modeling method can force the selected batch B to be diverse at each step so that the elements in the selected batch B have low redundancy. The actively-learned context modeling method iterates until the subset is of a certain size. Algorithm 2 can be seen in Table 2:

TABLE 2

Algorithm 2: Active context modeling for FLIF

Require: training set $\mathcal{D} = \{(c_i, \epsilon_i)\}_{i=1}^{N}$, MANIAC tree $p_\theta$, selection budget M, batch size B
1: select a subset $\mathcal{S}$ at random, $|\mathcal{S}| < M$
2: while $|\mathcal{S}| < M$ do
3:  train a MANIAC tree $p_\theta$ using $\mathcal{S}$
4:  $\forall (c_j, \epsilon_j) \notin \mathcal{S}$, navigate $(c_j, \epsilon_j)$ through $p_\theta$
5:  estimate the entropy $H_k$ for each leaf node k
6:  for each leaf node k do 7: $$\text{sample } B_k = B \cdot \frac{H_k}{\sum_k H_k} \text{ data points uniformly}$$

8:  update $\mathcal{S}$ to include newly sampled data
9:  end for
10: end while
11: train the final context model $p_\theta$ using $\mathcal{S}$ Algorithm 2 uses a training set D for a MANIAC tree. It should be understood that Algorithm 2 can be used in any context model. In one embodiment of Algorithm 2, a budget M and a batch size B is either provided or calculated or predetermined. M is the total size of the final subset of data. For example, if the image includes 1 million pixels, then the budget M could be 1% sampling of a 1 million pixel image. That is 1% of 1 Million=10 k. Therefore, in this example, the final subset size M of the 1 Million pixel image is 10 k. It should be understood that any other percentage can be used or any method can be used to determine or assign to the final subset. B is the batch size of context-residual pairs that are selected in each iteration and added to the subset. For example, if the batch size B is 5, then in each iteration 5 context-residuals pairs are selected and added to the subset. In this algorithm the size B should be smaller than the final subset size M. For example, if the batch size B is 1 k context-residual pairs that means 1K context-residual pairs are added in every iteration. Therefore, it might take 10 iterations to reach a size of 10 k (final subset size M). Initially, a subset of data S is selected, for example at random (Step 1 of Algorithm 2). It should be understood that the subset of data S can be selected using other methods as well, such as picking certain type of data or using an algorithm to select the subset of data or the like or a combination. The size of initial subset of data S selected in step 1 of Algorithm 2 is less than the budget M.

The value M is also the threshold subset of data size and can be a number of pixels allowed for training or a number of data allowed for training (an allowable data value). For example, M can be a predetermined amount of pixels from the training set or training data. In another example, M can be a number based on how fast the process should be. The subset of data S is iteratively grown until M is reached (Step 2 of Algorithm 2). The tree is grown or the context model is trained or the context model is built until reach maximum allowed target M. B refers to the size of the updated subset of data.

Continuing with Algorithm 2, while the size of the subset of data S is less than the M value, the initial context model is built or trained using the initial subset of data (Step 3 of Algorithm 2). In step 3 of Algorithm 2, an initial context model $\hat{\theta} = \mathcal{P}(f, S)$ is given, where $\hat{\theta}$ is the context model and $\mathcal{P}(f, S)$ refers to obtaining the context model using subset S.

Continuing with Algorithm 2, steps 5-8 are used to identify data from the rest of the training set to add to the subset in each iteration. In Step 5 of Algorithm 2, an entropy for each leaf node can be estimated or determined or calculated. An entropy value Hk for residuals in each leaf node k is determined (Step 5 of Algorithm 2). In one example, if the weighted entropy Hn of the leaf node is low that can indicate that the residuals in the leaf node are similar or the residuals are concentrated.

After determining the entropy value of each leaf node, steps 6-8 will sample only a certain number of context-residual pairs from each leaf node based on the entropy value. For example, if batch size is 5, that means steps 6-8 will select 5 context-residual pairs. However, a higher percentage of the batch $B_k$ will come from a leaf node with a higher entropy value ($H_k$/total $H_k$). As such, the sampled batch from each leaf node Bk is based on weighed entropy of the leaf node as noted in Step 7 of Algorithm 2.

Therefore, $B_k$ data points will be selected from each leaf node. In one example, Algorithm 2 allows the selected batch of data to cover as many modes of the data distribution as possible (e.g., selecting samples from each leaf node so that all leaf nodes are covered). As such, the number of data being selected from each leaf node k is proportional to the entropy of the corresponding leaf node. This means that the clusters with higher diversity will have more data sampled. Given the batch size B, each leaf node k is sampled:

$$B_k = B \cdot \frac{H_k}{\sum H_k}$$

(Step 7 of Algorithm 2), where B is the given batch size, $H_k$ is the calculated entropy value for each leaf node, and Bk is the sample size of node k.

Continuing with step 8 of Algorithm 2, the actively-learned context modeling method will update the subset of data with B amount of context-residual pairs that is distributed across all the leaf nodes as noted in steps 6 and 7 of Algorithm 2. Therefore, the subset of data in the leaf node can provide an optimal solution (Step 8 of Algorithm 2).

The steps of sampling the data for each leaf node and updating the new subset of data S to include the sampling is then reiterated for each leaf node until the size of the subset S reaches budget M (Steps 7 and 8 of Algorithm 2).

When the size of the subset of data S is not less than the budget M, the final context model is built using the updated subset of data S (Step 11 of Algorithm 2). The final context model is updated: $\hat{\theta} = \mathcal{P}(f, S)$ in step 11 of Algorithm 2.

By selectively updating the subset with a certain percentage of data based on the entropy value of the context model over the residuals in each leaf node, a low cross entropy can be obtained over the entire dataset.

Exemplary Implementation of Actively-Learned Context Modeling

Actively-learned context modeling can be implemented in any algorithm. In one example, actively-learned context modeling can be used in a FLIF image compression system. FLIF uses a decision tree based context model called MANIAC tree. The tree can be interpreted as a clustering model where candidate data points are navigated through the tree into one of the leaf nodes. Given the clustering results, a batch of candidate data can be selected and added for training at the next step by updating the subset of data which will be used in next iteration's training. In one example, a batch of data can be selected that are distributed across all leaf nodes. The selected batch can cover as many modes of the data distribution as possible. The number of data being selected from each leaf node can be proportional to the entropy of the corresponding leaf node.

Figure 8:
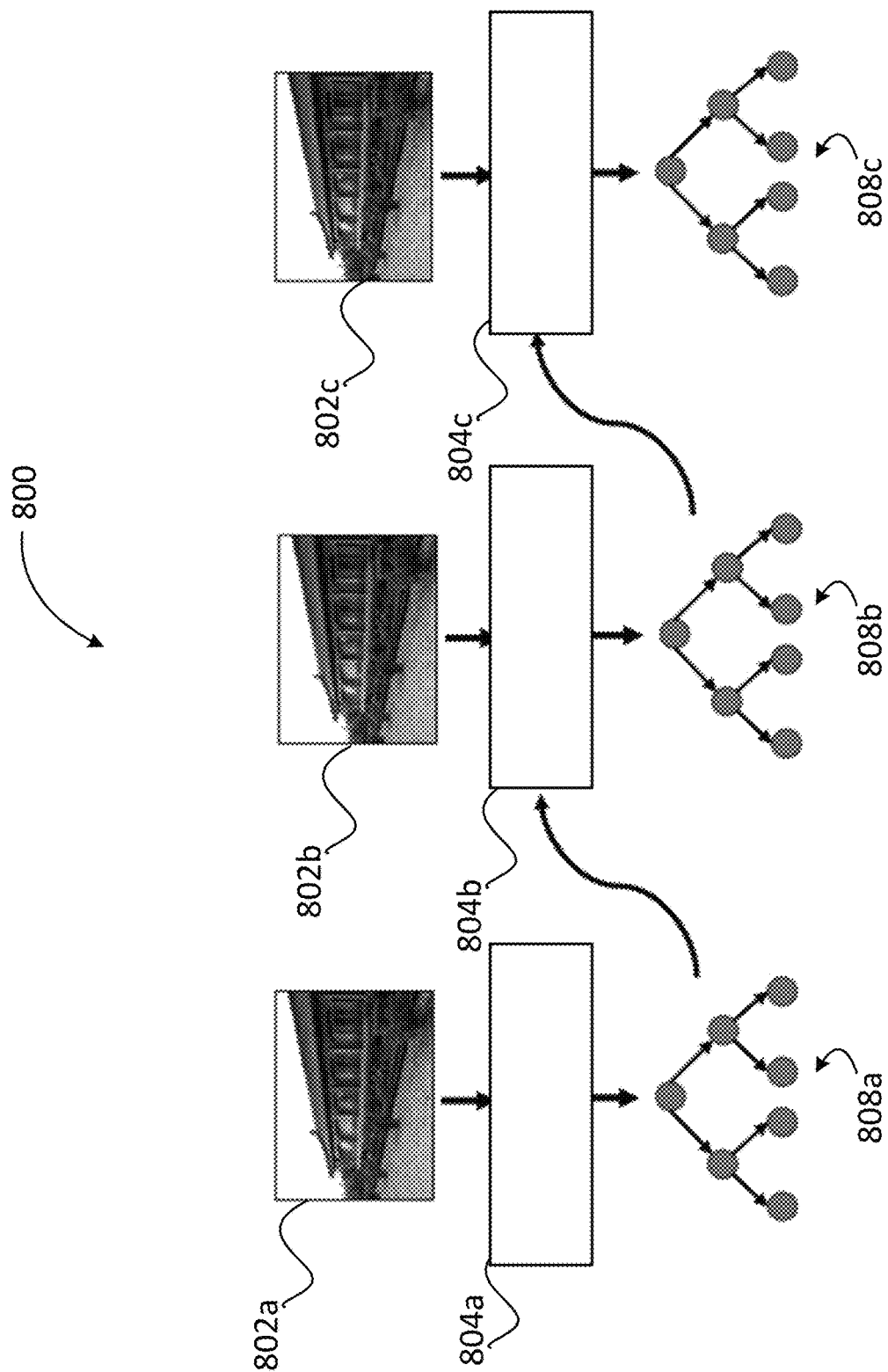
FIG. 8 illustrates an exemplary implementation for a burst compression using actively-learned context modeling in accordance with one embodiment of the present disclosure.

In one example, actively-learned context modeling can be used in compression algorithms for single images or for burst compressions. FIG. 8 illustrates an exemplary implementation for a burst compression using actively-learned context modeling in accordance with one embodiment of the present disclosure. For example, in a system that uses an algorithm such as FLIF for burst compression, the decision tree 808a, 808b, 808c can be interpreted as a clustering model. In a burst compression, trained tree from the previous frame 802a, 802b, 802c may be available. Since the frames 802a, 802b, 802c contain similar content, the tree 808a, 808b, 808c from the previous frame 802a, 802b, 802c can be used as a proxy to cluster the current frame 802a, 802b, 802c. A batch of training pairs can be selected from the leaf nodes of the tree 808a, 808b, and 808c. In one example, for the first frame 802a, the training pairs can be selected uniformly 804a at random since no previous frame exists. For the following frames 802b and 802c, the training pairs can be selected using active sampling 804b, 804c. In one example, after performing one iteration using actively-learned context modeling, a context model tree 808a is built and the entropy for each leaf node is calculated. For uniform sampling 808a, the training pair can be selected randomly from the training set. For active sampling 808b, 808b, the next iteration of the training pair comes from prior information of the training pairs. For example, in active sampling 808b, 808c, the next iteration of training pair of the tree can include the ratio of the entropy determined for the leaf node. For example, for the initial training pair, an initial training pair is selected at random and the entropy of each leaf node is calculated. Therefore, in active sampling 808b, 808c, the pixels can be actively selected based on the knowledge of the tree built using prior training pairs.

Exemplary Operating Environment

Figure 9:
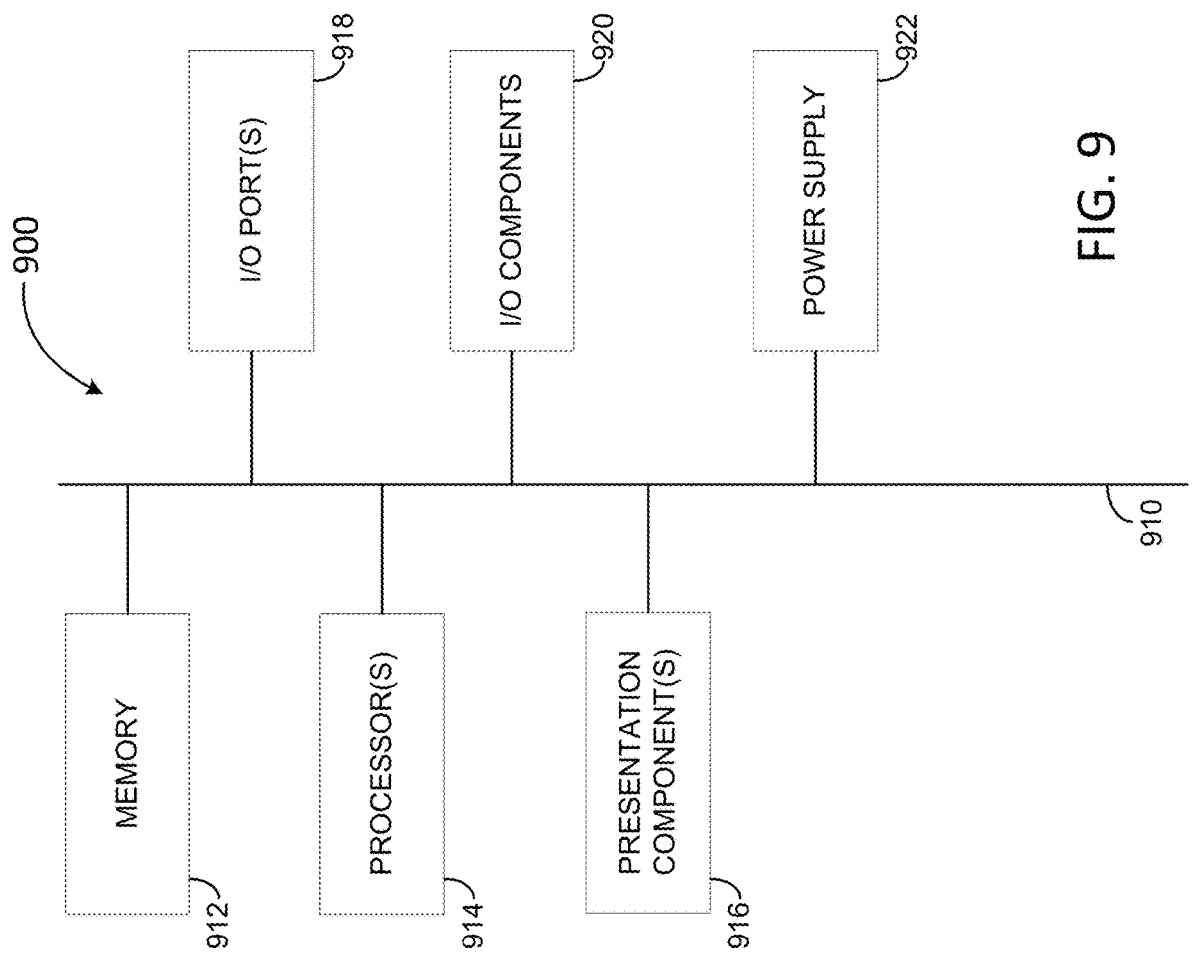
FIG. 9 is a block diagram illustrating an exemplary operating environment for implementing embodiments of the present technology is shown.

Having described implementations of the present disclosure, an exemplary operating environment in which embodiments of the present technology may be implemented is described below in order to provide a general context for various aspects of the present disclosure. Referring to FIG. 9, an exemplary operating environment for implementing embodiments of the present technology is shown and designated generally as computing device 900. Computing device 900 is but one example of a suitable computing environment and is not intended to suggest any limitation as to the scope of use or functionality of the technology described herein. Neither should the computing device 900 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology described herein may be practiced in a variety of system configurations, including hand-held devices, consumer electronics, general-purpose computers, more specialty computing devices, etc. The technology described herein may also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 900. The computing device 900 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion.

Aspects of the present technology have been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however, the distributed computing environment depicted herein is merely exemplary. Components can be configured for performing certain embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for actively-learned context modeling, the method comprising:
   selecting a subset of data from a training dataset corresponding with an image to be compressed, the subset of data corresponding with a subset of data of pixels of the image;

generating a context model using the selected subset of data, the context model in the form of a decision tree having a set of leaf nodes;

determining entropy values corresponding with each leaf node of the set of leaf nodes, each entropy value indicating an extent of diversity of context associated with the corresponding leaf node;

selecting additional data from the training dataset based on the entropy values corresponding with the leaf nodes, the additional data being used to update the subset of data; and using the updated subset of data to generate an updated context model for use in performing compression of the image.

2. The method of claim 1, further comprising:

iteratively updating the subset of data based on the subset of data attaining a threshold subset of data size.

3. The method of claim 2, wherein selecting the additional data includes selecting a batch size of additional data.

4. The method of claim 1, wherein the subset of data is initially selected at random.

5. The method of claim 1, wherein the subset of data includes context and residual information.

6. The method of claim 1, wherein the context model is a tree including leaf nodes.

7. The method of claim 1, wherein the data is an image comprising pixels.

8. The method of claim 7, wherein the training set is a single image or one or more burst compression images.

9. The method of claim 1, wherein the entropy value is determined by calculating a log probability over the training set.

10. The method of claim 9, wherein a high log probability provides a low cross entropy value.

11. The method of claim 1, wherein the additional data selected provides the lowest entropy compared to the data in the training dataset.

12. A computer-implemented method for actively-learned context modeling, the method comprising:

selecting a subset of data from a training dataset corresponding with an image to be compressed, the subset of data corresponding with a subset of pixels of the image;

generating a context model using the subset of data, the context model in the form of a decision tree having a set of leaf nodes;

iteratively updating the subset of data by adding new data from the training dataset to the subset of data, wherein the new data to add from the training dataset is selectively identified in each iteration by:

determining a likelihood of a prediction value for a portion of the training dataset absent in the subset of data;

selecting the new data from the portion of the training dataset absent in the subset of data, the new data having a highest likelihood of the prediction value;

updating the subset of data with the additional data; and using the updated subset of data to generate an updated context model for use in performing compression of the image.

13. The method of claim 12, wherein the subset of data is initially selected at random.

14. The method of claim 12, further comprising:

building a final context model using the subset of data when the subset of data attains a threshold subset of data size.

15. The method of claim 14, wherein the threshold subset of data size is a predetermined number of pixels allowed for training.

16. The method of claim 12, wherein the likelihood of prediction is a number of bits required to encode each residual in the context model.

17. The method of claim 14, wherein the final context model provides a low cross entropy value over the training dataset.

18. The method of claim 12, further comprising:

training a final context model when the size of the subset of data attains the threshold subset of data size.

19. The method of claim 12, wherein a smaller percentage of data of the updated subset of data is sampled from a leaf node having a lower entropy value.

20. A system comprising:

a memory device; and a processing device, operatively coupled to the memory device, to perform operations comprising:

selecting a subset of data from a training dataset corresponding with an image to be compressed, the subset of data corresponding with a subset of data of pixels of the image;

iteratively updating the subset of data by adding new data from the training dataset to the subset of data, wherein the new data to add from the training dataset is selectively identified in each iteration by:

generating an updated context model using the updated subset of data, the updated context model in the form of a decision tree having a set of leaf nodes;

determining entropy values corresponding with each leaf node of the set of leaf nodes, each entropy value indicating an extent of diversity of context associated with the corresponding leaf node; and selecting the new data from the training dataset based on the entropy values corresponding with the leaf nodes, the new data being used to update the subset of data; and based on the subset of data attaining a threshold subset of data size, using the corresponding updated subset of data to generate a final context model for use in performing compression of the image.

* * * * *